Dec. 27, 1927. 1,653,950
G. EVENO
DEVICE FOR THE RECOVERY OF LUBRICANT FROM AXLE BOXES
Filed March 18, 1927
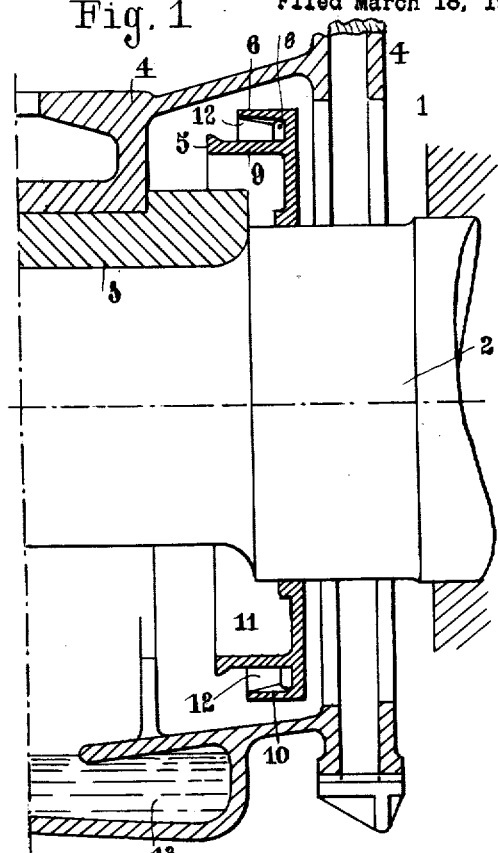
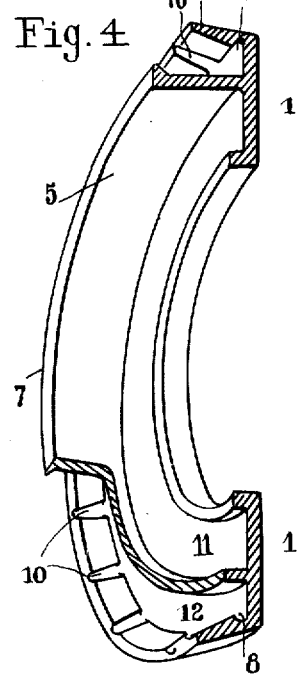
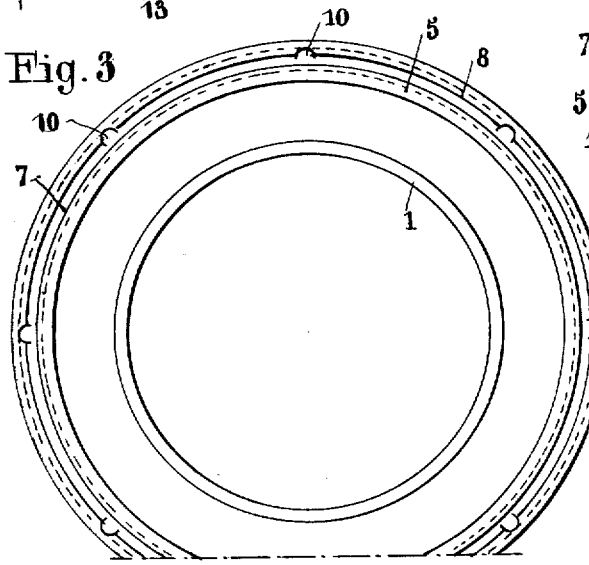
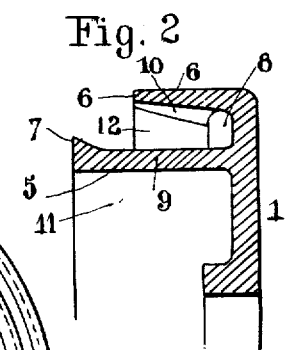
Inventor
Georges Eveno
By
Penner Davis... 
Attorneys Patented Dec. 27, 1927.

1,653,950

UNITED STATES PATENT OFFICE.

GEORGES EVENO, OF PARIS, FRANCE.

DEVICE FOR THE RECOVERY OF LUBRICANT FROM AXLE BOXES.

Application filed March 18, 1927, Serial No. 176,414, and in France October 25, 1926.

The present invention relates to devices adapted to prevent leakages of lubricant to the exterior of axle boxes of the rolling material of railways, tramways and so forth and to recover this lubricant.

In known devices of this type discs in the form of cups have been provided, secured to the axle, which are adapted to recover the oil which tends to escape and to project it, under the action of centrifugal force, against the walls of the box. The efficiency of such discs is however very incomplete by reason of the lateral shocks due to the zig-zag movement of the vehicle and the lateral wear which is produced whilst the pad is in operation.

The present invention has for its object to remedy this disadvantage, to prevent any leakage of lubricant and to enable it to be recovered by the use of a ring in the form of a double cup of which one portion, the inner cup, acts in the same manner as the known discs, whilst the outer cup is adapted to recover the drops of oil which the first cup may allow to escape.

In order that the invention may be readily understood it will be described hereinafter, but solely by way of example, with reference to the accompanying drawings wherein Figure 1 is an axial section of the new device for recovering oil, mounted on an axle.

Figure 2 is a similar view, to a larger scale, of a portion of the ring with the double cup shown alone.

Figure 3 is a side view of the ring, and

Figure 4 is a perspective view in an axial plane, partly in section.

In the various figures, 1 indicates the ring with the double cups keyed to the axle 2 (Figure 1) between the pad 3 and the lateral wall of the box 4. On this body 1 are provided two projecting flanges 5 and 6 which form a double cup, an internal one 11 and an external one 12. In the external cup 12 there is provided an annular recess 8 with which engage transverse grooves 10 arranged inclined in such a manner as to connect the inner edge of the said cup. The flange 5, terminating the wall 9, is also provided with an annular lip 7 extending parallel to the plane of the disc or ring 1.

This device operates as follows:

The lubricant is projected by the wall 9 under the action of centrifugal force, the annular lip serving to facilitate the detachment of drops of oil from the wall 9. But when the centrifugal force is insufficient to cause the lubricant to reach the wall of the body of the box 4, the drops of oil remain in suspension and fall by gravity on the outer face of this wall 9, that is to say, into the outer cup 12 by reason also of the presence of the lip 7 which brings the drops of oil towards the bottom of the cup 12.

The projections of the two edges 5 and 6 are calculated in such a manner that the edge of the second will be a suitable distance from that of the first. This distance corresponds, generally, to the permissible wear of the pads during operation in such a manner that the lubricant which is insufficiently projected by centrifugal force is necessarily recovered by the second cup 12.

This device with the double cup therefore enables the lubricant to be completely recovered and renders the zone of leakage of axle boxes substantially fluid-tight. It may however be mentioned that the lateral movement of the vehicles which increases in proportion to the wear of the pad during operation, facilitates the conveyance of the lubricant towards the outer cup 12 of the ring by which it is recovered.

It will be understood that without departing from the scope of the invention, various modifications may be made which do not alter the spirit thereof. Thus the form of construction shown in Figure 1, which is more particularly applicable to the axle of a vehicle of a railway provided with the end of the axle outside the wheel, may also be applied to vehicles with a chassis inside the wheels and also to axles of vehicles other than those of material rolling on rails, automobile vehicles for example. The new device may also be employed on the bearing blocks of stationary machines, motor machines or the like, especially those rotating at high speeds.

Having thus described my invention, what I claim as new and desire to secure by Leters Patent is:—

1. A device of the character described comprising an annular disc, and two annular rims of different diameter secured concentrically to one face of the disc, one of said rims being of greater width than the other, the rim of smaller width being adjacent the edge of the disc.

2. A device of the character described comprising an annular disc, and two annular rims of different diameter secured concentrically to one face of the disc, one of said rims being of greater width than the other, the rim of smaller width being adjacent the edge of the disc, said rim of smaller width being provided with an internal annular groove adjacent the point of its engagement with the said disc.

3. A device of the character described comprising an annular disc, and two annular rims of different diameter secured concentrically to one face of the disc, one of said rims being of greater width than the other, the rim of smaller width being adjacent the edge of the disc, the inner rim being provided with an annular lip extending in a plane parallel with the plane of the disc.

4. A device of the character described comprising an annular disc, and two annular rims of different diameter secured concentrically to one face of the disc, one of said rims being of greater width than the other, the rim of smaller width being adjacent the edge of the disc, said rim of smaller width being of tapered section, and having an annular groove formed on its inner surface adjacent the point of its engagement with the said disc, said rim of smaller width also having transverse grooves in its inner surfaces, said grooves extending from the outer edge of said rim to said annular groove.

In testimony whereof, I have signed my name to this specification.

GEORGES EVENO.

lar rims of different diameter secured concentrically to one face of the disc, one of said rims being of greater width than the other, the rim of smaller width being adjacent the edge of the disc, said rim of smaller width being provided with an internal annular groove adjacent the point of its engagement with the said disc.

3. A device of the character described comprising an annular disc, and two annular rims of different diameter secured concentrically to one face of the disc, one of said rims being of greater width than the other, the rim of smaller width being adjacent the edge of the disc, the inner rim being provided with an annular lip extending in a plane parallel with the plane of the disc.

4. A device of the character described comprising an annular disc, and two annular rims of different diameter secured concentrically to one face of the disc, one of said rims being of greater width than the other, the rim of smaller width being adjacent the edge of the disc, said rim of smaller width being of tapered section, and having an annular groove formed on its inner surface adjacent the point of its engagement with the said disc, said rim of smaller width also having transverse grooves in its inner surfaces, said grooves extending from the outer edge of said rim to said annular groove.

In testimony whereof, I have signed my name to this specification.

GEORGES EVENO.

CERTIFICATE OF CORRECTION.

Patent No. 1,653,950.     Granted December 27, 1927, to

GEORGES EVENO.

It is hereby certified that error appears in the printed specification of the above numbered patent requiring correction as follows: Page 1, line 65, after the figure "12", insert the paragraph, The annular recess 8 retains this recovered lubricant until the vehicle stops and the transverse passages 10 distribute it uniformly over the inner surface of the projecting edge 6, enabling the lubricant to flow back into the receptacle 13.; and that the said Letters Patent should be read with this correction therein that the same may conform to the record of the case in the Patent Office.

Signed and sealed this 29th day of May, A. D. 1928.

(Seal)

M. J. Moore,
Acting Commissioner of Patents.

CERTIFICATE OF CORRECTION.

Patent No. 1,653,950.　　　　　　　　　　　Granted December 27, 1927, to

GEORGES EVENO.

It is hereby certified that error appears in the printed specification of the above numbered patent requiring correction as follows: Page 1, line 65, after the figure "12", insert the paragraph, The annular recess 8 retains this recovered lubricant until the vehicle stops and the transverse passages 10 distribute it uniformly over the inner surface of the projecting edge 6, enabling the lubricant to flow back into the receptacle 13.; and that the said Letters Patent should be read with this correction therein that the same may conform to the record of the case in the Patent Office.

Signed and sealed this 29th day of May, A. D. 1928.

(Seal)

M. J. Moore,
Acting Commissioner of Patents.